Oct. 27, 1925.  
A. W. AITKEN  
1,558,769  
GEAR  
Filed Oct. 12, 1923

Inventor  
Andrew W. Aitken  
By Alexander Powell  
Attorneys.

Patented Oct. 27, 1925.

1,558,769

UNITED STATES PATENT OFFICE.

ANDREW W. AITKEN, OF SPRINGFIELD, OHIO.

GEAR.

Application filed October 12, 1923. Serial No. 668,240.

*To all whom it may concern:*

Be it known that I, ANDREW W. AITKEN, a citizen of the United States, residing at Springfield, in the county of Clark and State of Ohio, have invented certain new and useful Improvements in Gears; and I hereby declare that the following is a full, clear, and exact description thereof, reference being had to the accompanying drawings, which form part of this specification.

This invention is a novel improvement in gears, and the principal object thereof is to provide a novel gear, adapted to be mounted on a shaft, and having its teeth disposed on a pitch diameter which is relatively small compared with the diameter of the shaft itself, said gear being provided with a novel integral means for mounting the gear on the shaft without impairing the strength of the said gear.

My gear with its novel integral mounting means is particularly adapted for use in places where it has heretofore been necessary to form the teeth integral with the shaft for the reason that the hub of a gear of the same pitch diameter, would be relatively too thin to permit the cutting of the usual keyway in the bore of the hub. By using my novel mounting means a gear of the desired small pitch diameter may be readily mounted on the shaft, and will have the desired strength to withstand the stresses therein during operation.

My novel mounting means is designed for use with any type of gear or pinion, but is particularly designed for use in place of spur or worm teeth which are usually made integral with the shaft, because of the fact that the pitch diameter of the teeth is relatively so small with respect to the diameter of the shaft that there would not be sufficient strength and thickness in the hub of a gear of same size under said teeth and between the roots thereof to permit the cutting of the ordinary keyway in the bore of the hub.

Another object of the invention is to provide novel means for keyseating the keyway as hereinafter described.

I will explain the invention with reference to the accompanying drawing which illustrates one practicable embodiment thereof to enable others to adopt and use the same, and will summarize in the claim, the novel features of construction, and novel combinations of parts, for which protection is desired.

Figure 1:
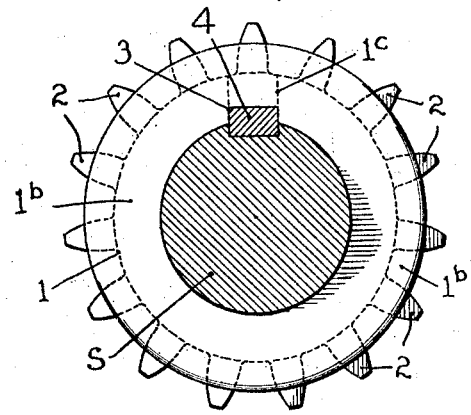
Fig. 1 is an end view of my novel gear, showing same keyed to a shaft.

As shown in the drawings my novel gear or pinion comprises a relatively thin hub portion 1 upon which the teeth 2 are mounted, said teeth shown in the drawing being of the spur type, but may, if desired be of any other type. The diameter of the bore $1^a$ of hub 1 is relatively so large as compared to the pitch diameter of the teeth 2, that there is insufficient strength and thickness of material in the body of the hub 1 and between the roots of the teeth 2 to permit cutting the usual keyway for mounting the gear on the shaft.

In order to provide means for keying the gear to shaft S without impairing the strength of the gear itself, I provide a tubular extension $1^b$ on one side of and integral with the hub 1, which extension $1^b$ is preferably of larger exterior diameter than that of the hub 1, and bore $1^a$ extends through the said extension $1^b$. Extension $1^b$ is of sufficient exterior diameter to permit cutting a keyway 3 therein without impairing the strength of the gear, and said keyway 3 preferably tapers inwardly and downwardly, and is adapted to receive a key 4 preferably of the gib head type inserted into the keyway 3 in the extension $1^b$, and into a complementary keyway $S'$ in the shaft S on which the gear is to be mounted. By driving the key 4 inwardly towards the hub portion 1 the key will be tightened in the keyway 3 by reason of the taper thereof and will securely lock the extension $1^b$, and hence the gear itself to the shaft S. Keyway 3 extends, as shown only within the extension $1^b$, and key 4 is preferably a gib head key to facilitate removal of the key from the keyway.

Figure 2:
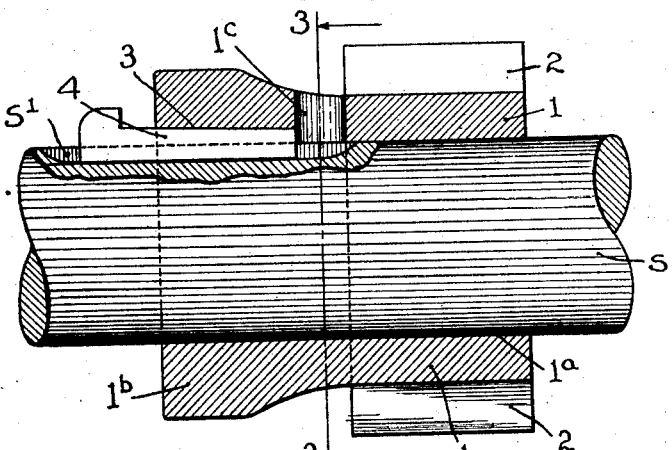
Fig. 2 is a longitudinal section through my novel gear.
Figure 3:
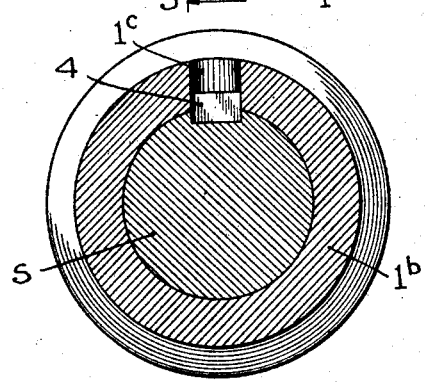
Fig. 3 is a transverse section on the line 3—3, Fig. 2.

If desired an extension hub $1^b$ may be formed on both sides of the teeth 2 instead of on the one side only, as shown in Fig. 2. When a hub extension is so formed on both sides of the teeth each extension would of course be provided with a keyway and key, whereby the gear would be secured to the shaft S by the two keys 4.

In order to facilitate the keyseating of the keyway 3, I preferably provide a transverse bore 1ᶜ in the extension or extensions 1ᵇ adjacent the teeth 2, said transverse bore 1ᶜ communicating with the inner end of the keyway 3, and with the bore 1ᵃ. If desired however the bore 1ᶜ may be omitted, as it is possible to finish the keyseat without using the bore 1ᶜ but by using said bore 1ᶜ the keyseating operation is greatly facilitated, bore 1ᶜ providing a space for the keyseating tool to run into while the keyseating operation is being performed.

I do not consider my invention restricted to gears and pinions of the spur type, for obviously, other forms of gears may be used therewith, within the scope of the invention.

My invention provides a gear with a pitch diameter of the teeth thereof which is relatively small compared with the diameter of the shaft on which the gear is to be mounted and my novel mounting means obviates the necessity of forming the teeth integral with the shaft, and provides sufficient strength and thickness of material in the hub portion adjacent the keyway to prevent injury to the gear when the same is in operation.

I claim:

In combination, a gear for the purpose specified comprising a body portion having a hub extension of greater thickness than that of the body, said hub extension and body being provided with a keyway extending through the hub extension only; a shaft provided with a keyway cooperating with the keyway in the hub extension; and a key adapted to fit said cooperating keyways; said hub extension being provided with an opening adjacent the gear to facilitate the key-seating and key-unseating.

In testimony that I claim the foregoing as my own, I affix my signature.

ANDREW W. AITKEN.